United States Patent [19]
Leroux

[11] Patent Number: 5,960,107
[45] Date of Patent: Sep. 28, 1999

[54] METHOD FOR VERIFYING AN AVERAGE TOPOGRAPHY HEIGHT FUNCTION OF A PHOTOSTEPPER

[75] Inventor: Pierre Leroux, San Antonio, Tex.

[73] Assignee: VLSI Technology, Inc., San Jose, Calif.

[21] Appl. No.: 08/581,649

[22] Filed: Dec. 28, 1995

[51] Int. Cl.$^6$ .................................................. G06K 9/00
[52] U.S. Cl. .................................... 382/145; 356/374
[58] Field of Search ........................... 382/145; 250/306, 250/307; 356/376, 374, 355–357; 364/488–491

[56] References Cited

U.S. PATENT DOCUMENTS

| | | | |
|---|---|---|---|
| 5,319,570 | 6/1994 | Davidson et al. | 364/488 |
| 5,418,363 | 5/1995 | Elings et al. | 250/306 |
| 5,465,154 | 11/1995 | Levy | 356/382 |
| 5,691,540 | 11/1997 | Halle et al. | 250/372 |

*Primary Examiner*—Christopher S. Kelley
*Attorney, Agent, or Firm*—Majestic, Parsons, Siebert & Hsue

[57] ABSTRACT

A method for verifying the accuracy of an average topography height function of a photostepper is provided, which includes the steps of placing a wafer on the photostepper for subjecting at least one layout disposed thereon to the average topography height function of the photostepper, wherein the layout has a known average topography height; operating the average topography height function of the photostepper to obtain a measured average topography height; and comparing the measured topography height to the known average topography height. A method for compensating for an inaccuracy of the average topography height function of the photostepper which includes the same steps for verifying the function, whereby an error results; and adds the step of compensating subsequent measurements of the average topography height function by a correcting factor equal to the magnitude of the error. Another method is also provided for verifying and the accuracy of and for calibrating an inaccuracy of the average topography height function which includes the use of a focus/exposure matrix.

7 Claims, 8 Drawing Sheets

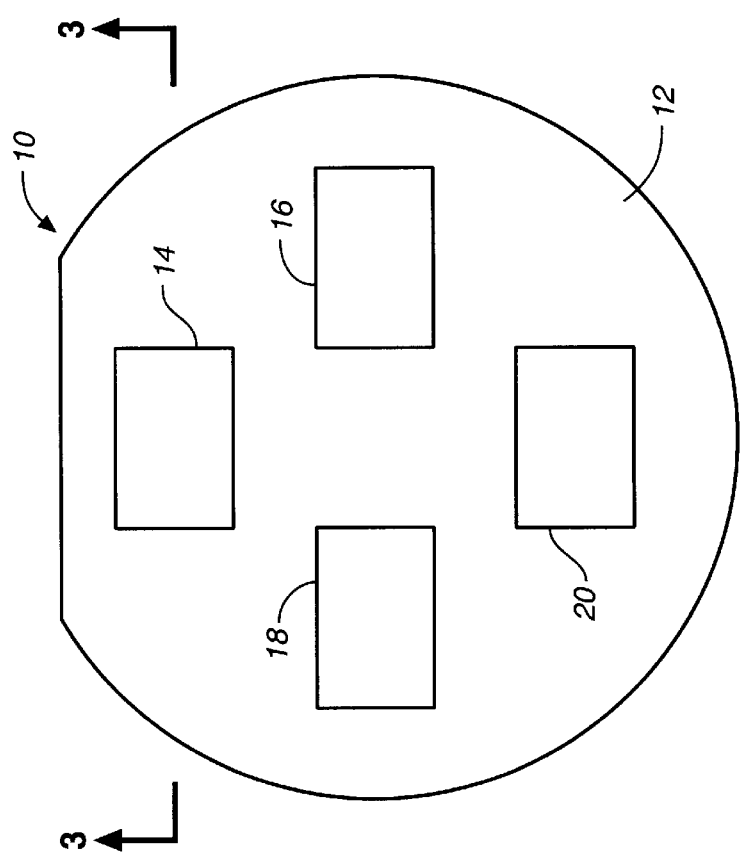
FIG._2
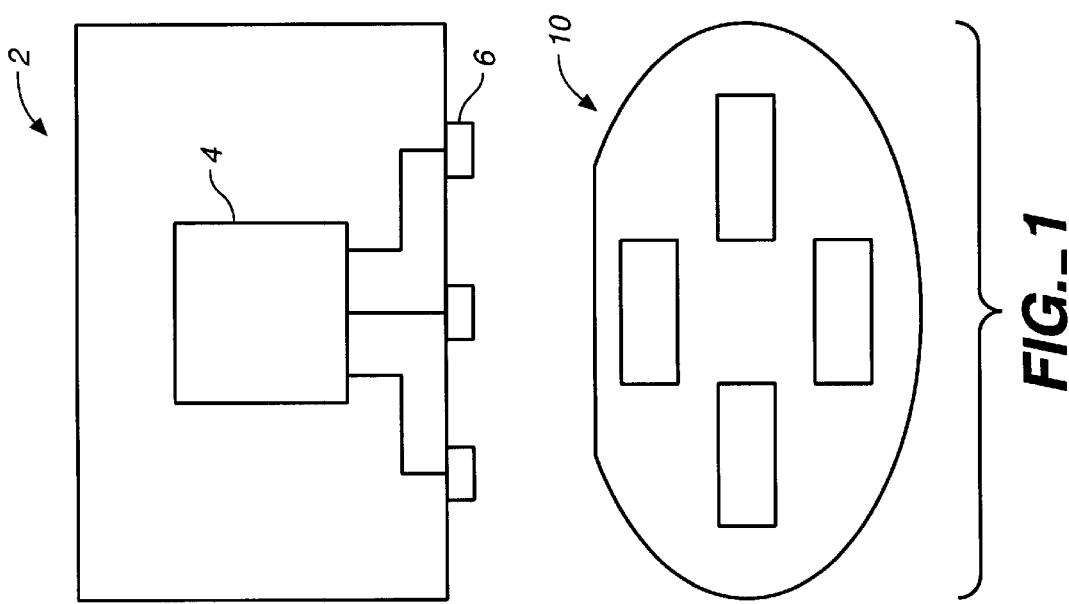
FIG._1

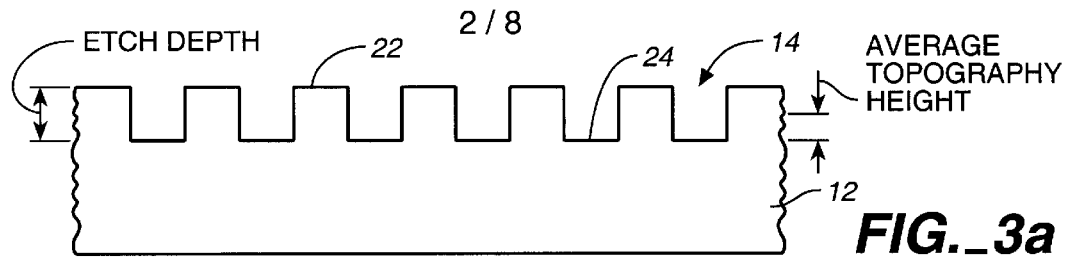
FIG._3a
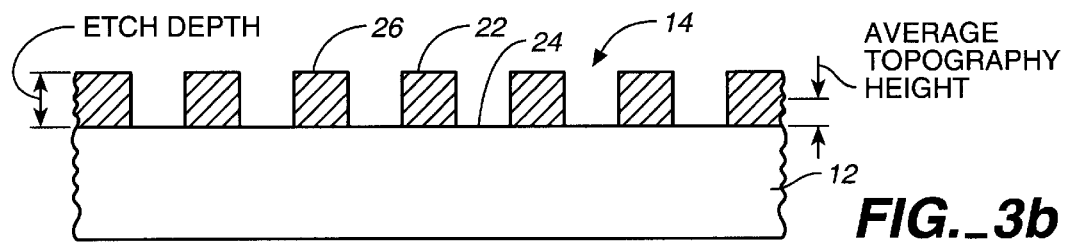
FIG._3b
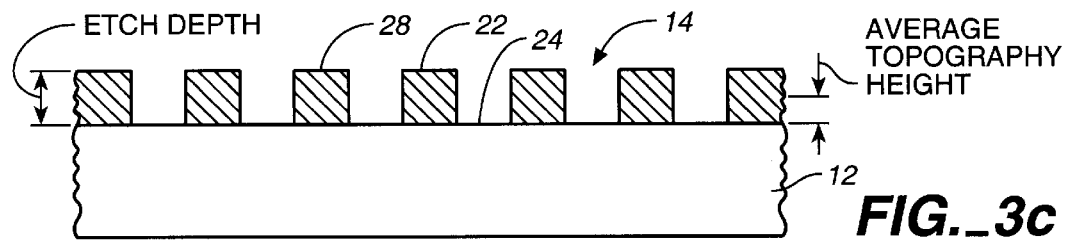
FIG._3c
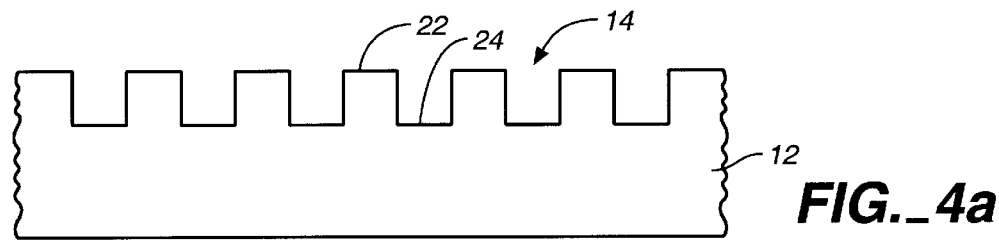
FIG._4a
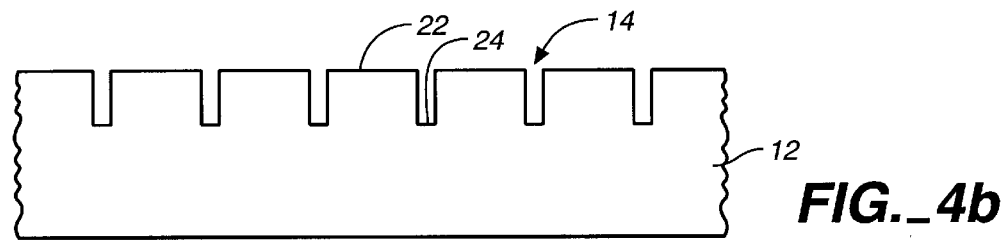
FIG._4b
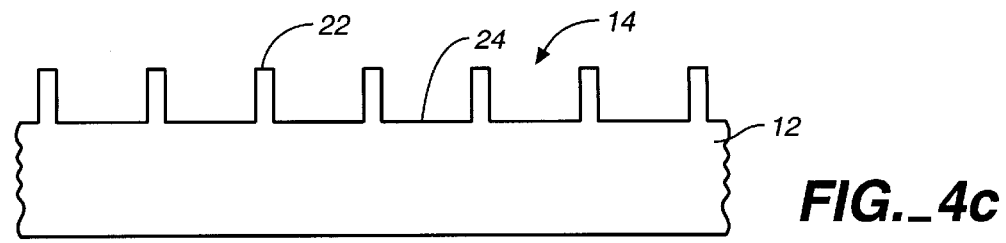
FIG._4c

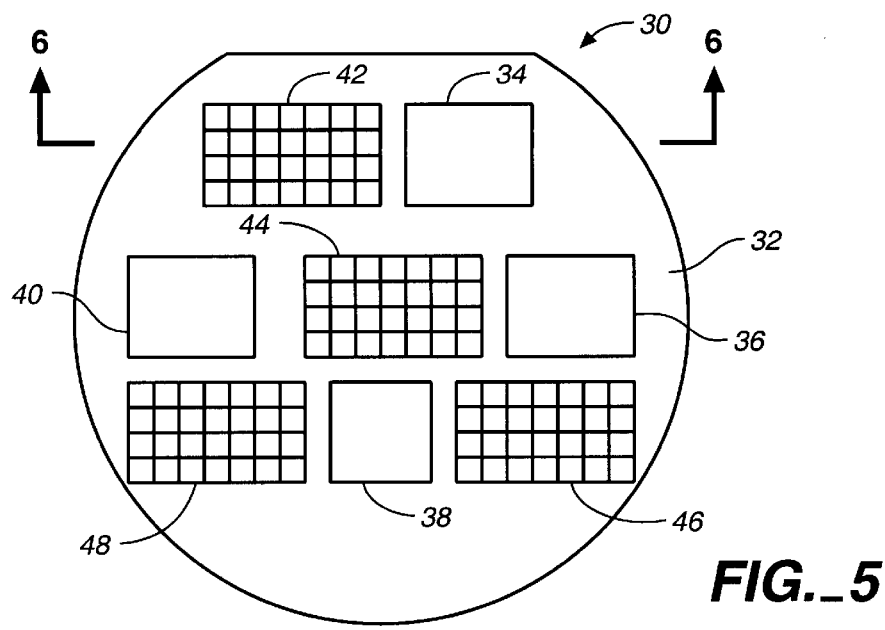
FIG._5
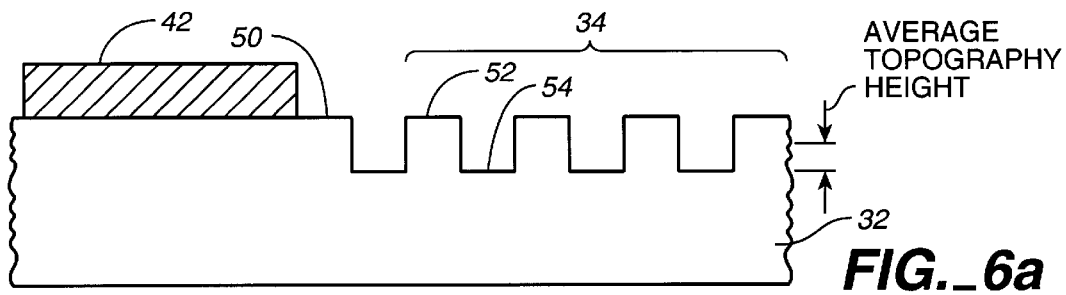
FIG._6a
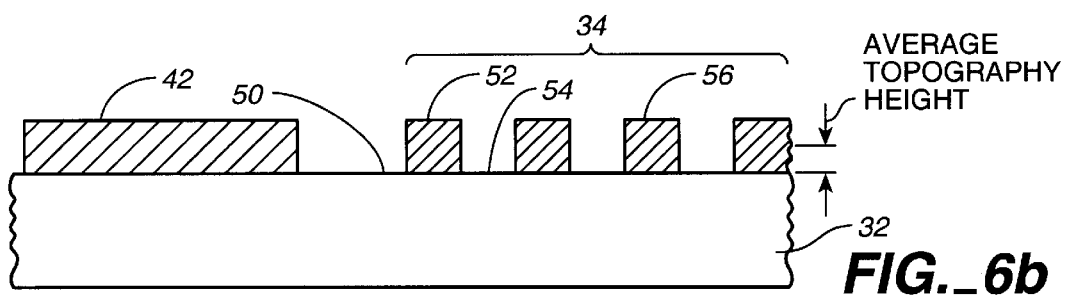
FIG._6b
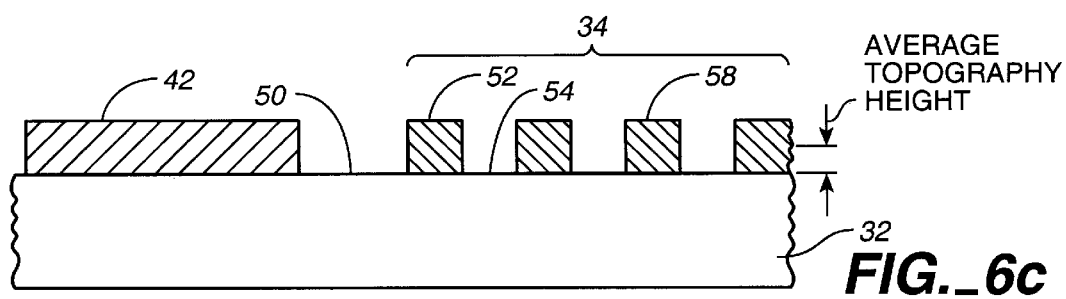
FIG._6c

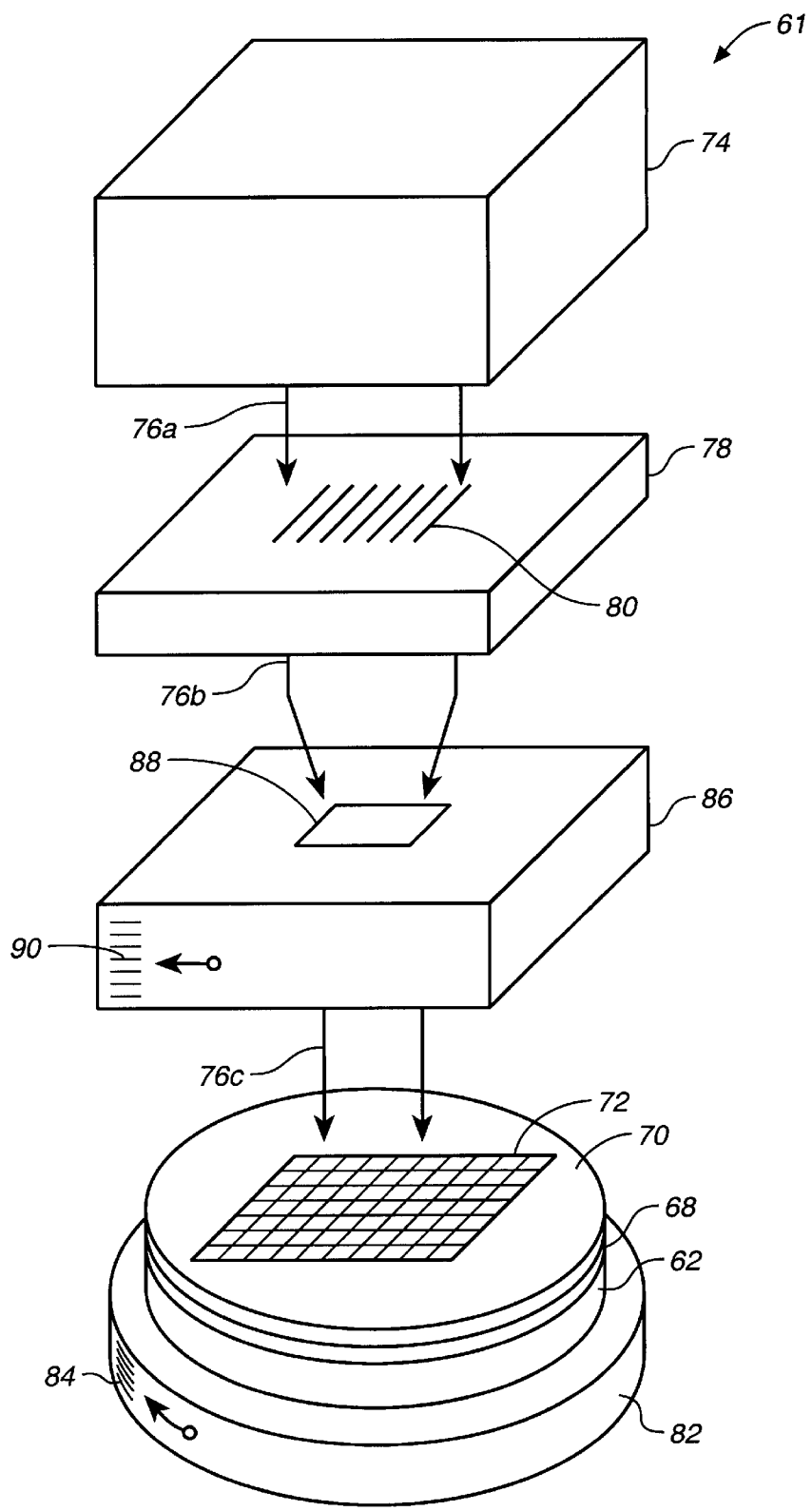
FIG._7

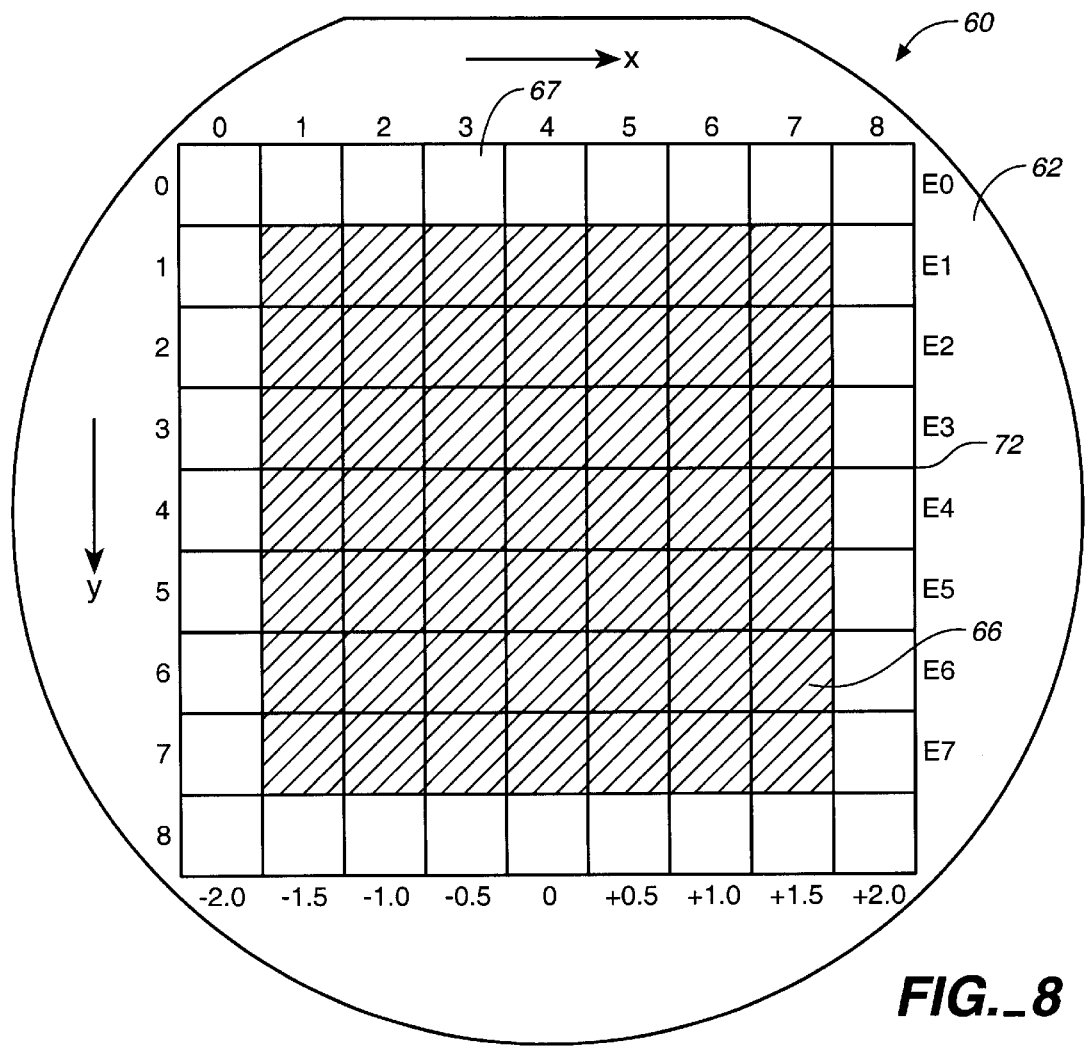
FIG._8
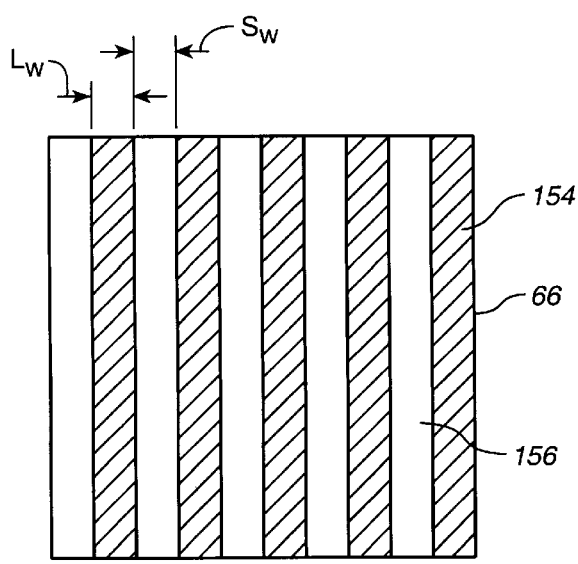
FIG._14

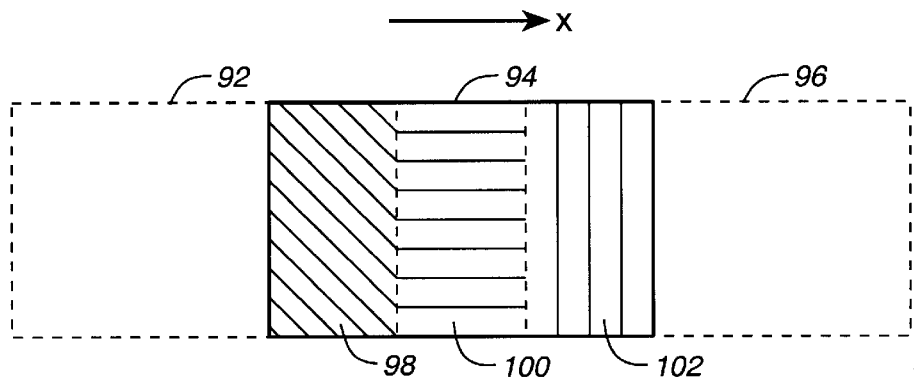
FIG._9
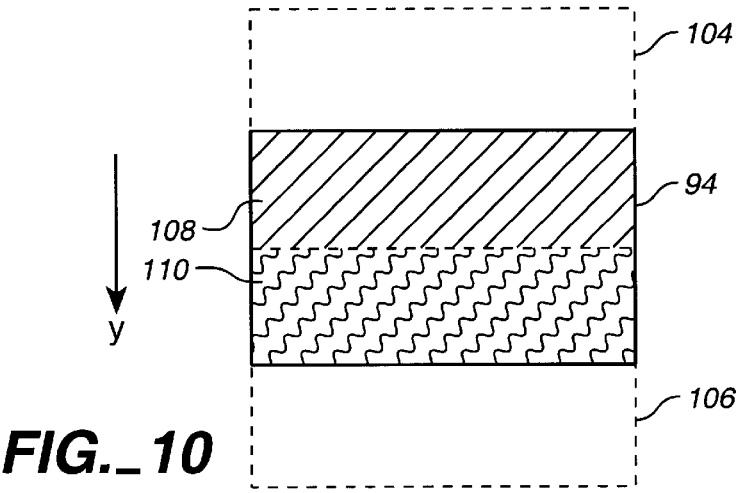
FIG._10
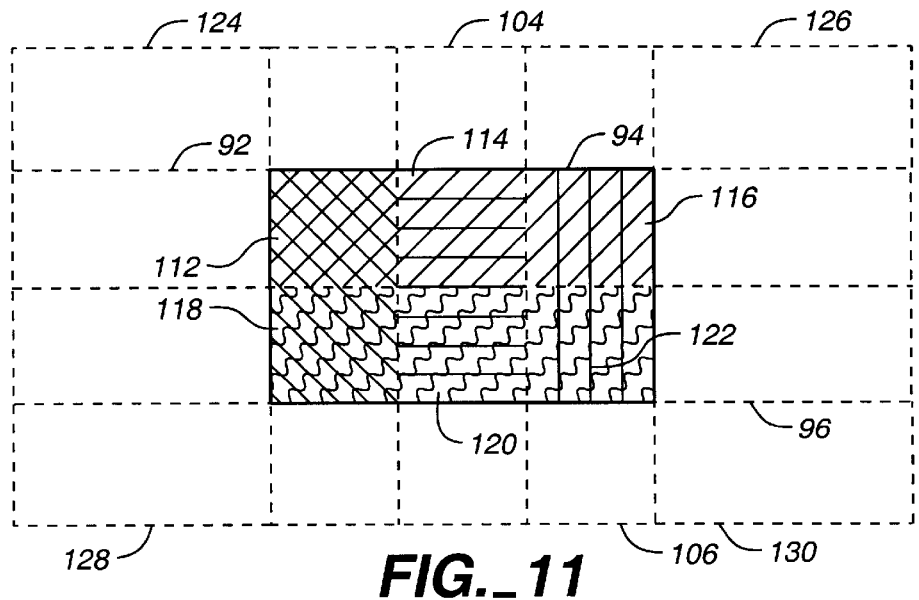
FIG._11

| EXPOSURES | OVERLAY EXPOSURE REGIONS ($\frac{FOCUS}{EXPOSURE\ TIME}$) | | | | | |
|---|---|---|---|---|---|---|
| | 112 | 114 | 116 | 118 | 120 | 122 |
| 124 | $\frac{-0.1}{E_a}$ | | | | | |
| 104 | $\frac{0}{E_a}$ | $\frac{2(0)}{2E_a}$ | $\frac{0}{E_a}$ | | | |
| 126 | | | $\frac{+0.1}{E_a}$ | | | |
| 92 | $\frac{-0.1}{E_b}$ | | | $\frac{-0.1}{E_b}$ | | |
| 94 | $\frac{0}{E_b}$ | $\frac{2(0)}{2E_b}$ | $\frac{0}{E_b}$ | $\frac{0}{E_b}$ | $\frac{2(0)}{2E_b}$ | $\frac{0}{E_b}$ |
| 96 | | | $\frac{+0.1}{E_b}$ | | | $\frac{+0.1}{E_b}$ |
| 128 | | | | $\frac{-0.1}{E_c}$ | | |
| 106 | | | | $\frac{0}{E_c}$ | $\frac{2(0)}{2E_c}$ | $\frac{0}{E_c}$ |
| 130 | | | | | | $\frac{+0.1}{E_c}$ |
| $\frac{EFFECTIVE\ FOCUS}{EXPOSURE\ TIME}$ | $\frac{-0.5}{2(E_a+E_b)}$ | $\frac{0}{2(E_a+E_b)}$ | $\frac{+0.5}{2(E_a+E_b)}$ | $\frac{-0.5}{2(E_b+E_c)}$ | $\frac{0}{2(E_b+E_c)}$ | $\frac{+0.5}{2(E_b+E_c)}$ |

FIG.–12

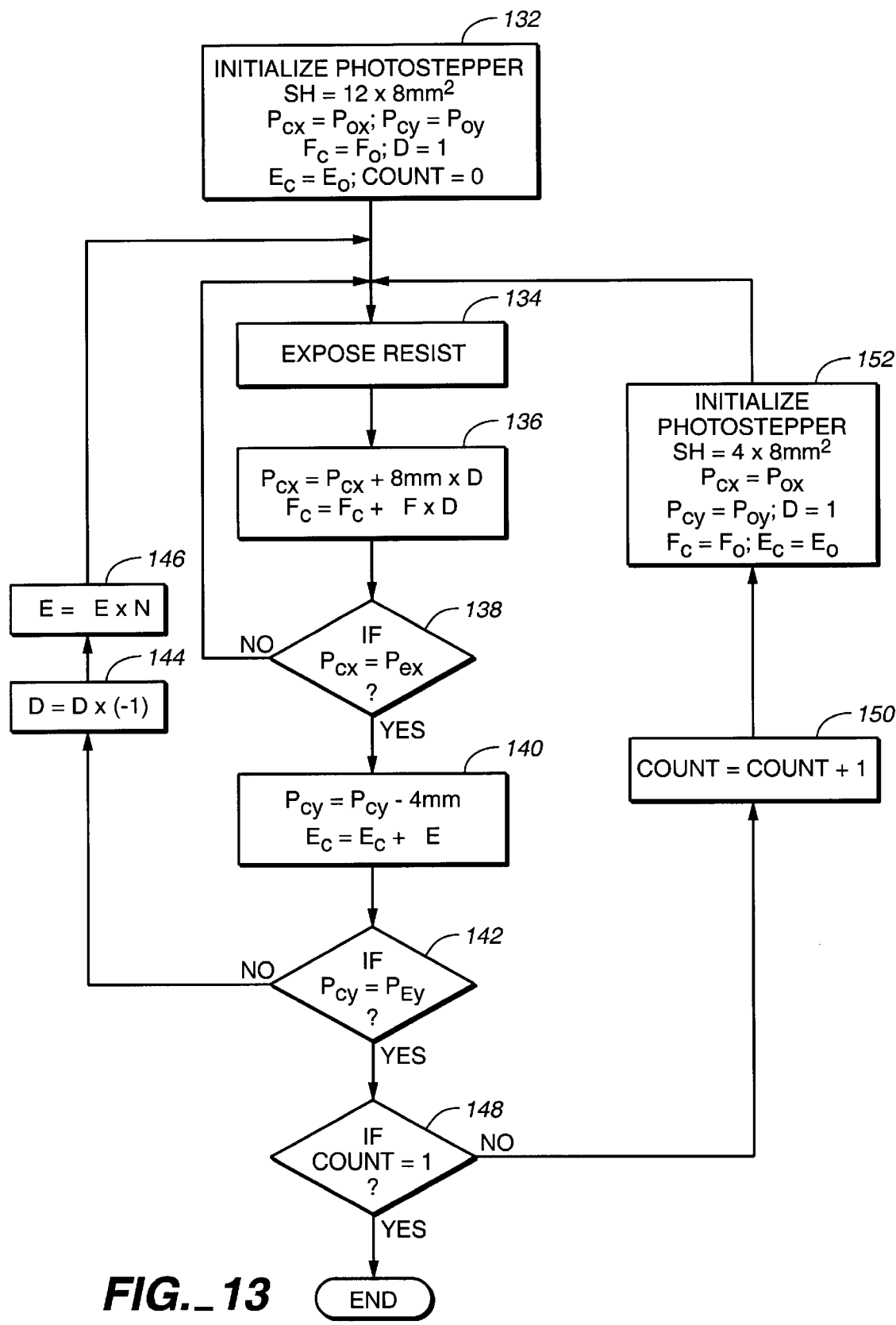
FIG._13

METHOD FOR VERIFYING AN AVERAGE TOPOGRAPHY HEIGHT FUNCTION OF A PHOTOSTEPPER

FIELD OF THE INVENTION

This invention relates to a method for verifying and calibrating a photostepper, and in particular, a method for verifying the accuracy and compensating for inaccuracies of an average topography height function of a photostepper.

BACKGROUND OF THE INVENTION

During the past twenty years, the developments in the field of manufacturing very large scale integrated circuits have been phenomenal. Circuits that used to occupy an entire room have been shrunken into a small integrated circuit, which may fit into, for example, a small calculator or computer. And still the aim of many in the industry is to further reduce the size of circuits so as to occupy even smaller areas.

As circuits are reduced in size, each component within each circuit is likewise reduced in size. The problem, however, lies in manufacturing these smaller components without degrading the function and performance of the circuits. This is where each component's line and space definitions are crucial in the production of these integrated circuits. Such line and spacing definitions are approaching dimensions near a tenth of a micron. Therefore, there is a need to have accurate equipment and manufacturing techniques in manufacturing these types of integrated circuits.

One equipment commonly used in manufacturing very large scale integrated circuit is a photostepper. A photostepper is used to expose a layer of resist disposed over a wafer to electromagnetic radiation spatially modulated with a circuit pattern. The photostepper usually steps and repeats the exposure of the resist so as to form images of multiple circuit patterns on the resist. The wafer is subsequently removed and subjected to an etching process so as to leave a pattern disposed on the wafer defining the multiple circuit patterns.

The manner in which a photostepper exposes the layer of resist is by projecting an image of the circuit pattern towards the wafer. A reticle or mask having a series of darken images disposed thereon defining the circuit pattern is interposed between a light source and the wafer, and a controllable shutter is interposed between the mask and the wafer. The light source is constantly energized and the photostepper periodically opens its shutter so that electromagnetic energy having the proper wavelength emanating from the light source and propagating through the image on the mask strikes the resist. The shutter is thereafter moved to a different position over the wafer and another exposure is performed. Generally, this process is repeated until an array of exposures is formed on the resist.

When exposing the circuit pattern images onto the resist, it is important that the image be properly focused. Otherwise, blurred images of the circuit pattern will form on the resist resulting in blurred circuit patterns when the resist in subsequently developed. Therefore, the operator of the photostepper must insure that the images of the circuit patterns are optimally focused onto the resist.

Some photosteppers relieve the operator of this duty by providing an automatic focus sensor. An example of such a photostepper is the Canon model no. 2500i3, and whose operation manual, entitled "FPA-2500 i2/i3" and published in 1992, is herein incorporated by reference. The automatic focus sensor scans the surface of the wafer and determines an optimum focus setting for the region that was scanned. Once this is performed, the photostepper then proceeds to expose the resist using the optimum focus setting.

The developing of a circuit on a wafer may comprise many processing steps including depositing and etching of thin-films and the wafer itself. Because of prior multiple depositing and etching processes, a wafer may obtain a surface with large varying topography heights. The topography height of a wafer is the height of a particular feature on the surface of the wafer relative to a reference height on that surface. Some features will have low topography heights because it has undergone, for example, multiple etching steps. Other features will have high topography heights because it has undergone, for example, multiple depositing steps. This presents a problem for the automatic focus sensor. Because the focus sensor finds the optimum focus for a particular topography height, the optimum focus will not correspond to all surfaces in a region having substantial variation in its topography height.

Some photosteppers resolve this problem by providing an average topography height function. An example of such a photostepper is again the Canon model no. 2500i3. The average topography height function works in conjunction with the automatic focus sensor of the photostepper. The automatic focus sensor scans and records the optimum focus for a multitude of topography heights across a region on the surface of the wafer. The average topography height function takes these focus readings and calculates an average topography height for the region and an optimum focus setting for that height. Once this occurs, the photostepper is ready to expose the layer of resist over that region using the average topography height's optimum focus setting. If, however, the average topography height function is not properly obtaining the average topography height, the photostepper will be exposing the resist over that region with a focus setting that is not optimum.

Another concern is whether the average topography height function can track the average topography height of various regions across the wafer having correspondingly different average topography heights. This concern arises, for example, if the various regions on the surface of the wafer have been reserved for different circuit patterns. Obviously, different circuit patterns are going to have different topographies, and accordingly, different average topography heights. During a production run, the photostepper must change its focus setting so that each region may be exposed using its optimum focus setting. Therefore, it is important that the average topography height function can track the various average topography height of various regions across the wafer.

Yet another matter of concern is whether the average topography height function can track the average topography height of various regions across the wafer having correspondingly different etch densities. The etch density of a region is defined as the area of the region on the surface of the wafer that have been etched divided by the total area of the region. An etch density of 100 percent, for example, means that the region has been totally etched. Whereas an etch density of 50 percent means that half the area of the region has been etched and the other half has not. The etch density of a wafer may vary if, for example, various regions on the wafer are reserved for the production of different circuits. Therefore, it is important that the average topography height function of the photostepper track the average topography height of various regions across the wafer having correspondingly different etch densities.

OBJECT OF THE INVENTION

Thus, it is an object of this invention to provide a method for verifying the accuracy of an average topography height function of a photostepper.

It is another object of this invention to provide a method for compensating for an inaccuracy of the average topography height function of the photostepper.

It is another object of this invention to provide a method for verifying the accuracy of the average topography height function of the photostepper for various regions across the surface of a wafer, where each regions has a correspondingly different average topography height.

It is another object of this invention to provide a method for verifying the accuracy of the average topography height function of the photostepper for various regions across the surface of a wafer, where each regions has a correspondingly different etch density.

SUMMARY OF THE INVENTION

These and additional objects are accomplished by the various aspects of the present invention, wherein, briefly and generally, a method for verifying the accuracy of the average topography height function of a photostepper is provided, comprising the steps of placing the wafer on the photostepper for subjecting at least one layout disposed on the wafer to the average height function, where the layout on the wafer has a known average topography height; operating the average topography height function to determine a measured average topography height for that layout; and comparing the known average topography height to the measured average topography height.

A method for compensating for an inaccuracy of the average topography height is also provided which includes the same steps of the above verifying method, whereby an error results, and adds the additional step of compensating subsequent measurements of the average topography height function by an error correcting factor substantially equal to the magnitude of the error.

Another embodiment of the method for verifying the accuracy of the average topography height function is provided which comprises the steps of placing a wafer on the photostepper for subjecting at least one layout disposed on the wafer to the average height function, wherein the wafer further includes a substantially flat portion having a known flat topography height; operating the average topography height function to determine an optimum focus for the measured average topography height for the pattern; forming and examining a focus/exposure matrix on the flat portion to determine an optimum focus setting corresponding to the height of the flat portion; calculating a focus offset defined as the difference between the optimum focuses corresponding to the height of the flat portion and the measured average topography height; and comparing the focus offset to the measured average topography height.

Another embodiment of the method for compensating for an inaccuracy of the average topography height function is provided which includes the same steps as the previous method for verifying the accuracy of the average topography height function, whereby an error results, and further provides the step of compensating subsequent measurements of the average topography height function by an error correcting factor substantially equal to the magnitude of the error.

BRIEF DESCRIPTION OF THE DRAWINGS

FIG. 1 is a simplified block diagram of a photostepper as used in the embodiments of the invention;

FIG. 2 is an illustration of an archive or test wafer having layouts disposed thereon as used in the embodiment of the invention;

FIGS. 3a, 3b and 3c are cross-sectional views of three variations of layouts of the test wafer of FIG. 2 taken along line 3—3 of FIG. 2 as used in the embodiment of the invention;

FIGS. 4a–c are cross-sectional views of layouts for another embodiment of the test wafer as used in the invention;

FIG. 5 is an illustration of another archive or test wafer as used in the embodiment of the invention;

FIGS. 6a–c are cross-sectional views of three variation of layouts of the wafer of FIG. 5 as used in the embodiment of the invention;

FIG. 7 is a symbolic diagram of a simplified photostepper for use in forming a focus/exposure matrix on a wafer as embodied in this invention;

FIG. 8 is a top view of the wafer having the focus/exposure matrix disposed thereon as embodied in this invention;

FIG. 9 is a top view of three overlapping exposures used in forming the focus/exposure matrix on the wafer as embodied in this invention;

FIG. 10 is a top view of one of the exposures in FIG. 9 being overlapped with two other exposures used in forming the focus/exposure matrix as embodied in this invention;

FIG. 11 is a top view of a combination of the overlapping exposures of FIGS. 9 and 10 used in forming the focus/exposure matrix as embodied in this invention;

FIG. 12 is a table illustrating the components of each overlapping exposure regions used in forming the focus/exposure matrix on the wafer as embodied in this invention;

FIG. 13 is a flow diagram of the steps the photostepper performs in forming the focus/exposure matrix on the wafer as embodied in this invention; and FIG. 14 is a top view of the reference pattern used in forming the focus/exposure matrix on the wafer as embodied in this invention.

DETAILED DESCRIPTION OF THE PREFERRED EMBODIMENTS

FIG. 1 shows a simplified block diagram of an archive or test wafer 10 placed on the photostepper 2 for subjecting the wafer 10 to an average topography height function 4 of the photostepper 2. A sophisticated photostepper, such as the Cannon model no. 2500i3, generally has a plurality of focus sensors 6 to help the operator of the photostepper to focus the stepper's lens towards the surface of the test wafer 10. As mentioned earlier, the photostepper 2 can operate the focus sensors 6 to find out the optimum focus for a certain topography height on the surface of the test wafer 10. In addition, the photostepper can cause the focus sensors to take readings of the optimum focus for various topography height in a region of the surface of the wafer. These readings are generally stored in memory within the photostepper. The average topography height function 4, generally implemented through software but not necessarily so, retrieves these optimum focus readings and then mathematically calculates the average optimum focus for all these readings and also the average topography height for the region being tested. The average topography height function 4 is a relatively new feature built into a photostepper which finds the average or optimum topography height for a region on the surface of a wafer that has been scanned by the focus sensor 6. The average topography height of a region is defined as the sum of all heights scanned in a region divided by the number of heights scanned. The test wafer 10 is then used to determine whether the average topography height function 4 is working properly, and if not, to provide the operator information so that calibration or adjustment of the average topography height can be performed.

FIG. 2 shows the test wafer 10 used in verifying the accuracy of and calibrating the average topography height function 4 of a photostepper 10. The test wafer 10 is comprised of a silicon wafer 12 having a plurality of layouts or etched patterns 14, 16, 18 and 20 disposed thereon. Although throughout the specification, a silicon wafer will serve as an example, other types of wafers may be used to illustrate the inventive concept, for example a gallium arsenide wafer. In addition, although a plurality of layouts have been shown, it shall be appreciated for the purpose of this invention, that one such layout would suffice. Each of the layouts on the wafer 12 have been manufactured to have known topography heights or etch depths, and preferably each layout having a unique topography height. For example, layouts 14, 16, 18 and 20 may have been etched to attain a topography height of 0.2, 0.4, 0.6 and 0.8 micron, respectively.

FIGS. 3a, 3b and 3c are cross-sectional views of three variations of layouts of the test wafer 10 taken along line 3—3 of FIG. 2. In the first layout variation shown in FIG. 3a, the layout 14 is constructed by etching the top surface of the silicon wafer 12. Preferably, the layout is patterned so that a plurality of hills 22 and valleys 24 are formed such that they are intermixed. Layout 14 may be processed to attain a certain topography height, so that all the valleys 24 for a particular layout are situated at substantially the same topographical height. The hills 22 generally remain unetched and should be situated at substantially the same topographical height. Therefore, in order for the hills 22 to be situated at substantially the same height, a relatively flat silicon wafer 12 is recommended. Such a flat wafer may be pre-selected from a batch of wafers. The other layouts 16, 18 and 20 may be formed in a similar fashion; however, preferably they would be processed to attain, respectively, a unique etch depth or topography height. After processing, the height may be checked by various method known in the art to determine the precise etch depth of each layout and then to ascertain its corresponding average topography height.

The layout 14 as shown in FIG. 3a is generally the preferred manner of forming a layout for topography test purposes. Other manners are shown in FIGS. 3b and 3c. The layout 14 in FIG. 3b is initially constructed using a flat silicon wafer 12 and a layer of resist 26 disposed thereon. The layer of resist 26 is then etched to form the plurality of hills 22 and valleys 24 as discussed above. FIG. 3c shows another variation of layout 14. Similar to layout 14 in FIG. 3b, this layout in constructed using a flat silicon wafer 12 and a layer of thin-film 28 disposed thereon. The layer of thin-film 28 is then etched to form the plurality of hills 22 and valleys 24. The layout 14 in FIG. 3a is preferred because the surface of the silicon wafer 12 is less prone to wear and tear then the layer of resist 26 or the layer of thin-film 28.

Once the test wafer 10 has been processed and the average topography height of each layout therein is determined, then a method for verifying the accuracy of the average topography height function 4 of the photostepper 2 can be performed. The first step in the method is to place the test wafer 10 on the photostepper 4 so that the layouts on the wafer may be subjected to an analysis by the average topography height function 4 of the photostepper 2. The photostepper 2 is then operated so that the focus sensors 6 perform a reading of the topography height at multiple points on the layout. The average topography height function 4 then mathematically determines a measured average topography height of the layout. This measured average topography height can then be compared to the known average topography height so that verification of the accuracy of the average topography height function 4 can be determined. This process can be repeated for all other layouts on the wafer to verify the accuracy of the average topography height function for various known average topography height corresponding to each layout on the test wafer 10.

If after the verification test is performed, the results show that the average topography height function 4 of the photostepper 2 is not working properly, the operator can compensate subsequent operations of the average topography height function 4 using the results from the verification process. That is, during the verification process, it may be found that the measured average topography height does not substantially match the known average topography height. As a result, there will be an error defined as the difference between the measured average topography height and the known average topography height. The operator can later take that error and apply an error correcting factor which is substantially equal and opposite to the error to subsequent measurements by the average topography height function. Thus, compensating for any inaccuracies due to the average topography height function 4. So instead of using the measured average topography height function for subsequent operations of the topography height function, use the measured average topography height either subtracting or adding the correction factor so that the error is cancelled out. The compensation process can be repeated for each layout on the test wafer 10 and an error correcting factor substantially equal and opposite to the average errors corresponding to each layout can be used for subsequent operations of the average topography height function 4.

The verification test can be performed on layouts having different etch densities. The etch density is defined as the area etched on the surface of the layout divided by the total area of the surface of the layout. FIGS. 4a–4c show three variations of layout 14 having each a distinct etch density. For example, layout 14 shown in FIG. 4a has an etch density of approximately 50 percent. That is, the area corresponding to the top of the hills 22 is approximately equal to the area corresponding to the bottom of the valleys 24, or the region of the layout that has been etched. FIG. 4b shows a variation of layout 14 that has a relative low etch density. That is, the area corresponding to the top of the hills 22 is much greater than the area corresponding to the bottom of the valley 24. FIG. 4c shows a variation of layout 14 having a relatively high etch density. That is, the area corresponding to the top of the hills 22 is much smaller than the area corresponding to the bottom of the valleys 24.

For relatively high or low etch density, the accuracy of the average topography height function 4 of the photostepper 4 is diminished. The problem with layouts having relatively low etch densities is that the focus sensors 6 of the photostepper 2 may have difficulties in determining the optimum focus reading and topography height of the valleys 24. The reason is that with relative low etch densities, the area of the valleys 24 become very small, and it is difficult for the focus sensors 6 to differentiate light reflecting off the surface of the valleys 24 from the light reflecting off the surface of the top of the hills 22. The problem with layouts having relative high etch densities is that the focus sensors 6 has difficulties in determining the optimum focus reading and topography height of the top of the hills 22. Similarly, the reason is that with relative high etch densities, the area of the top of the hills 22 becomes very small, and therefore it is difficult for the focus sensors 6 to differentiate between light reflecting from the surface of the top of the hills 22 and light reflecting from the surrounding surfaces of the valleys 24.

Generally, the average topography height function 4 can provide accurate results for layouts having a certain range of etch densities. It is useful to determine the trackable range of etch densities for the average topography height functions. Many circuit patterns have very small features such as the valleys 24 of a relative low etch density layout (FIG. 4b) and the hills 22 of a relative high etch density layout (FIG. 4c). If one tries to measure the average topography height of a circuit pattern having such small features, one may not be sure of whether accurate results are obtained by the average topography height function 4. That is why it is useful to determine such trackable range for the average topography height function 4. It has been found that the Canon model no. 2500i3 has a trackable range for layouts having roughly 5 to 95 percent etch densities.

The method for verifying the accuracy of the average topography height function 4 of the photostepper 2 for layouts having a range of etch densities has the same steps as the method for verifying the topography height function of the photostepper. That is, a test wafer 10 is placed on the photostepper 2 for subjecting layouts thereon to the average topography height function 4. However, this method uses a test wafer 10 having a plurality of layouts disposed thereon, each having substantially the same known average topography height but different etch densities. A measured average topography height for each of the layouts is ascertained and then compared to the known average topography height. For those layouts where the measured topography height substantially matches the known average topography height, it is assumed that the average topography height function 4 can perform accurate measurements for layouts having corresponding etch densities. For those layouts where the reading is inaccurate, it is assumed that the average topography height cannot measure layouts having corresponding etch densities. By manufacturing a test wafer that has layouts each having different etch densities varying from 5 percent to 95 percent, for example, a trackable range for the average topography height function can be determined.

FIGS. 5 and 6a–6c show another archive or test wafer 30 used in another method of the invention used to verify the accuracy and for calibration of the average topography height function 4 of the photostepper 2. The test wafer 30 includes a silicon wafer 32 having a plurality of layouts 34, 36, 38 and 40 disposed thereon. Again, a silicon wafer is used to exemplify the invention, and therefore, the invention is not limited solely to a silicon wafer. The layouts disposed thereon can be similar to the layouts and its variations of test wafer 10; however, in this method, the average topography height for these layouts are unknown. Adjacent or near the proximity of each layout is a corresponding flat portion 50 of the surface of the wafer 32 or an unetched portion of the wafer 32. Disposed over the flat portion 50 is a layer of resist 42, where a focus/exposure matrix will subsequently be formed. Each layout will have a corresponding focus/exposure matrix formed adjacent thereto. For example, layouts 34, 36, 38 and 40 has corresponding focus/exposure matrix 42, 44, 46 and 48, respectively. However, prior to the start of the method, the area where the focus/exposure matrix will lie comprises a layer of resist disposed over the wafer's flat portion 50.

The method for verifying the accuracy of the average topography height function 4 of the photostepper 2 includes the step of placing test wafer 30 on the photostepper 2 for subjecting a layout disposed thereon to the average topography height function 4 of the photostepper 2. The next step performed is to operate the average topography height function so that a measured average topography height and an optimum focus setting for that height are obtained. As will be explained in more detail later, the photostepper 2 is operated so that a focus/exposure matrix is formed on the layer of resist situated near each of layouts. The focus/exposure matrix can then be examined to ascertain the topography height of the flat portion 50 of the wafer and the optimum focus setting for that height. As shown in FIGS. 6a–6c, the flat portion 50 usually corresponds to either the height of the top of the hills 52 (FIG. 6a) or the height of the bottom of the valleys 54 (FIGS. 6b and 6c). A focus offset, which is a direct measurement of the average topography height, is calculated by subtracting the optimum focus setting value corresponding to the flat portion by the optimum focus setting value corresponding to the measured average topography height. The optimum focus setting value for a particular feature on the wafer is related to the distance between the focal point of the focus sensors 6 and that particular feature. If the optimum focus setting value for one feature is subtracted from the optimum focus setting for another feature, it would indicate the distance between the two features. Therefore, by determining the focus offset which is defined as the difference between the optimum focus setting values of the flat portion 50 and that of the average topography height, one can ascertain the distance between the flat portion and the average topography height. Since that distance equals the average topography height, by comparing focus offset to the measured topography height, one can ascertain whether the average topography height function 4 is working properly; i.e., if the focus offset substantially matches the measured average topography height, that is an indication that the average topography height is working properly. Otherwise, if the focus offset does not substantially match the measured average topography height, that would be an indication that the average topography height is not working properly.

This process can be repeated for each layout on the test wafer 30, to determine if the average topography height function 4 works well for different etch depths. However, the step of forming a focus/exposure matrix 72 need not be repeated again since the topography height and its corresponding optimum focus has previously been determined. Also similar to the prior method, the trackable range of etch densities can be determined using this method. The compensating for an inaccuracies of the average topography height function 4 using this technique includes all the steps for verifying the accuracy of the average topography height function 4 using test wafer 30, whereby an error results, and adds the step of compensating subsequent operations of the average topography height function 4 by an error correcting factor equal and opposite to the error. This compensating technique can be performed for multiple layouts on the wafer 30; however, the error correcting factor is preferably the average of the errors obtained corresponding to each layout.

FIG. 7 shows a symbolic diagram of a simplified photostepper 61 used to create a focus/exposure matrix 72 on a wafer 62. Although photosteppers in general are very complicated, including many optical-processing components such as optical filters, condensing lenses, mirrors and so forth, for illustration purposes, the photostepper 61 as shown in FIG. 7 includes the components needed to describe the various aspects of this invention. The photostepper 61 comprises various optical components, all of which are in optical communication with each other and form an optical series path linking a light source 74 at one end to a wafer 62 at an opposite end. The light source 74 is optically coupled to a reticle or mask 78 which has a reference pattern 80 disposed thereon. The reticle 78 is optically coupled to a controllable shutter 86 having an aperture therethrough defining a frame 88. The shutter 86 is optically coupled to the wafer 62 which has a layer of resist 70 disposed on the wafer 62. The wafer 62 may also include a layer of a thin-film 68 interposed between the wafer 62 and the resist 70.

In operation, the light source 74 produces a light beam 76a having a specified wavelength. As it is well known in the art, the selection of the light wavelength depends on the material used for the resist 70. The light chemically alters the resist 70 such that the resist is either weakened or strengthened relative to attacks from an etching process. The light beam 76a propagates through the reticle 78 such that a portion of the beam is blocked by the reference pattern 80 and a complementary portion of the beam propagates through the reference pattern 80 to form a patterned light beam 76b. The patterned light beam 76b will be spatially modulated with the reference pattern 80 so that its image may be exposed onto the resist 70. The patterned light beam 76b thereafter propagates through the frame 88 of the controllable shutter 86, where the contour of the patterned light beam 76b is limited by the size and shape of the frame 88 to form exposing light beam 76c. The frame 88 acts as a normally-closed optical valve which is periodically opened by the controllable shutter 88 so that the resist 70 is exposed a frame at a time. The wafer 62 sits on a chuck 82 which can be adjusted to move vertically or tilt so that an image of the reference pattern 80 can be focused upon the surface of the wafer.

As shown in FIG. 7, both the chuck 82 and the controllable shutter 86 have a series of discrete settings 84 and 90 for adjusting the focus and exposure time of each exposure, respectively. The focus settings 84 usually has a focus resolution defined as the difference in the focus between closest focus settings. For example, the Canon model no. 2500i3 photostepper provides for a focus resolution of 0.1 micron and focus settings ranging from −50 microns to +50 microns. Likewise, the exposure time settings has a finite exposure time resolution and multiple exposure time settings. For the Canon model no. 2500i3, the exposure time resolution is 0.1 mJ/cm$^2$ and has exposure time settings ranging from 0 mJ/cm$^2$ to 3000 mJ/cm$^2$. Although throughout this application, reference to the Canon model no. 2500i3 will serve as an example for illustrating this invention, it shall be appreciated that the method of forming a focus/exposure matrix on a wafer as embodied in this invention may be used with other brands of photostepper having a finite focus resolution and a plurality of focus settings. Another photostepper having these properties include the Nikon model no. GCA ASM SVG.

It is a critical step in the process of creating precise circuit patterns on a wafer, especially for patterns having small line and spacing definitions, that the focus and exposure time settings 84 and 90 be adjusted to optimum settings so that the resist is optimally exposed. As with a camera for example, if one shoots a picture with the camera being defocused, blurred images will result. Similarly, if the photostepper's focus setting is not optimum, blurred circuit pattern images will be exposed onto the resist, and as a result, blurred patterns would form on the wafer. When small line and spacing definitions are required for forming a pattern, a defocused exposure may result in blurring two lines together, where there should have been a space in between the lines. Hence, there is a need to determine the precise focus setting in order to minimize this type of blurring. Similarly, having a precise exposure time is also critical in forming a circuit pattern on a wafer. A precise exposure time depends on many factors, including the type of resist used, the thickness of the resist, and the line and spacing minimum definitions. An exposure time that is too short, for example, may result in the resist not sufficiently undergoing photochemical reactions so that it causes problems in the subsequent etching process. An exposure time that is too long may result, on the other hand, in exposing the resist in areas which are to remain unexposed. This may lead to blurring of the image formed on the resist. Hence, a precise exposure time is required to prevent insufficient photochemical reactions or blurring. This is where a focus/exposure matrix is used to determine the precise focus and exposure time settings of the photostepper in order to optimize the forming of a thin-film circuit pattern on a wafer.

Referring now to FIG. 8, it shows an archive wafer 60 comprising the silicon wafer 62 having a pattern disposed thereon defining the focus/exposure matrix 72. Although a silicon wafer is used to exemplify the various aspects of this invention, it shall be appreciated by those skilled in the art that other types of wafers can be used, such as a gallium-arsenide wafer. The focus/exposure matrix 72 comprises a series of patterns 66 which are usually, but not necessarily, arranged in rows and columns. Patterns may be either formed by patterning the resist, or patterning the wafer itself, or patterning a thin-film layer disposed on the wafer. But in the preferred embodiment, patterning the resist is chosen because the wafer 62 may be reusable. Patterns 66 are represented by squares having diagonal lines therein. Patterns 67, in the extremity of the matrix 72 and represented by squares not having diagonal lines therein, are not used in the calibrating process. They are residue patterns formed in the focus/exposure matrix forming process. For purposes of identification, the rows and columns in the matrix 72 have been sequentially numbered so that referencing a particular pattern may be facilitated by listing the row and column and enclosing it with parenthesis. The x-direction is illustrated as being generally horizontal and the y-direction is illustrated as being generally vertical, wherein the upper-left pattern is designated, for example, pattern (0,0) and the pattern pointed to by reference number 66 is designated pattern (6,7). The matrix 72 is formed such that the patterns in a row are characterized by being formed with substantially the same exposure time. For example, the exposure time corresponding to patterns (1,1) and (1,7) being substantially the same, and for illustration designated E1 (representing the exposure time for patterns in row 1). Each row having patterns formed with a distinct exposure time and preferably in an incrementing manner, such that the exposure times increases step-wise from E1 for patterns in row 1 to E7 for patterns in row 7. Also preferably, the series of increasing exposure time from E1 to E7 incrementing in a non-linear manner.

In a similar fashion, the patterns in the same column are characterized by having been formed with substantially the same effective focus. For example, the effective focus for patterns (1,4) and (5,4) being substantially the same. Each column has patterns being formed with a distinct effective focus, and preferably in an incrementing manner. In addition, patterns in every other column having an effective focus corresponding to the focus setting of the photostepper. For example, if the photostepper has focus settings −0.2, −0.1, 0, +0.1 and +0.2 micron, wherein the focus resolution is 0.1 micron, then patterns in columns 0, 2, 4, 6, 8 have effective focuses corresponding to those settings, respectively. Patterns in columns 1, 3, 5 and 7 have effective focuses approximately −0.15, −0.05, +0.05 and +0.15 micron, respectively. Accordingly, the difference in effective focus between column patterns is half the focus resolution of the photostepper, i.e. 0.05 micron focus resolution.

The focus/exposure matrix 72 is useful in calibrating the photostepper for achieving the optimum focus and exposure time setting. By examining each pattern in the focus/exposure matrix, preferably under a microscope, one can determine which pattern has been optimally exposed. By locating the optimum pattern, one can determine the optimum focus and exposure time settings for the photostepper, for example, corresponding to the flat portion 50 of wafer 30. The creation of an archive wafer 60 and the inspection thereof is usually conducted before a production run of actual circuit wafers is processed by the photostepper. In this way, once the photostepper has been calibrated using this method, production circuit patterns should be optimally exposed, thereby resulting in less circuit pattern defects.

Referring to FIGS. 9–11, the process of which these patterns 66 are formed is by overlapping single exposures of reference pattern 80 onto the resist 70. FIG. 9 is used to illustrate how the patterns are formed so that the effective focus corresponding to adjacent column patterns differs by an amount of around half the focus resolution of the photostepper. First, an exposure 92 of reference pattern 80 is formed on the resist 70. The shape of exposure 92 being proportional to frame 88, which is preferably rectangular in shape. The preferred dimension for exposure 92 is approximately 12 millimeters in the x-direction by 8 millimeters in the y-direction. Exposure 92 is formed with an initial focus and exposure time setting, such as −0.1 micron and $E_b$.

The shutter 86 is then moved a distance of 8 millimeters (i.e. two-thirds of the long side of the rectangular frame) in the x-direction. An exposure 94 of reference pattern 80 is formed on the resist 70. The exposure 94 is formed with substantially the same exposure time $E_b$ as exposure 92 but with a focus corresponding to an adjacent focus setting, such as for example 0 micron. Accordingly, the difference in focus between exposures 92 and 94 corresponds to the focus resolution of the photostepper 61. A first overlapping region 98 is formed comprising the right third of exposure 92 overlapped with the left third of exposure 94. The effective exposure time of overlapping region 98 is the additive sum of the exposure time for exposures 92 and 94, i.e. $2E_b$. The effective focus of overlapping region 98 is the average of the focus for exposures 92 and 94, i.e., −0.05 micron.

The shutter 86 is thereafter moved another 8 millimeters (i.e. two-thirds of the long side of the rectangular frame) in the x-direction. An exposure 96 of reference pattern 80 is formed on the resist 70. The exposure 96 is formed with the substantially the same exposure time $E_b$ as exposure 94 but with a focus corresponding to an adjacent focus setting, such as +0.1 micron. A second overlapping region 102 is formed comprising the right third portion of exposure 94 and the left third portion of exposure 96. The second overlapping region 102 has an effective exposure time of $2E_b$ and an effective focus of +0.05 micron.

Exposure 94 now has a middle region 100 that is not overlapped by either adjacent exposures 92 or 96. Since overlapping regions 98 and 102 have been double exposed and region 100 is exposed only once, to be consistent, region 100 is preferably exposed again with the same exposure time and focus setting as exposure 94, i.e. $E_b$ and 0 micron. In this way, region 100 obtains an effective exposure time of $2E_b$ and an effective focus of 0 micron. The way in which the photostepper accomplishes this is by positioning the shutter 86 where exposure 94 was shot, but narrowing frame 88 so that only the middle portion of reference pattern 80 exposes the resist. The net result is that overlapping regions 98, 100 and 102 have substantially the same effective exposure time, i.e. $2E_b$ and an effective focus of −0.05, 0 and +0.05 micron, respectively. Thus, the difference in effective focus between adjacent regions is half the focus resolution of the photostepper, and at least one region has an effective focus corresponding to a focus setting of the photostepper, i.e. region 100 has an effective focus of 0 micron corresponding to the 0 micron focus setting.

FIG. 10 is used to illustrate how the patterns 66 are formed so that patterns in adjacent rows have differing exposure time. An exposure 104 of reference pattern 80 is formed on the resist such that a lower-half portion of exposure 104 is overlapped with an upper-half portion of internal exposure 94, forming a third overlapping region 108. Exposure 104 has been formed with the same focus setting as exposure 94, i.e. 0 micron for example, and with an exposure time of $E_a$, for example. In this manner, overlapping region 108 has an effective exposure time of $(E_a+E_b)$. An exposure 106 of reference pattern 80 is formed on the resist 70 such that an upper-half portion of exposure 106 is overlapped with a lower-half portion of exposure 94 forming a fourth overlapping region 110. The exposure 106 being formed with the same focus setting as exposure 94, i.e. 0 micron for example, and an exposure time of $E_c$, for example. In this manner, overlapping region 110 obtains an effective exposure time of $(E_b+E_c)$. Preferably, $E_a$, $E_b$, $E_c$, and subsequent exposure times corresponding to additional rows form a series of incrementing exposure time, and which preferably, increments in a non-linear fashion.

When the steps as discussed above with respect to FIGS. 9 and 10 are combined, overlay exposure regions 112, 114, 116, 118, 120 and 122 are formed as shown in FIG. 11. The components of each overlay exposure regions are tabulated in FIG. 12. These overlay exposure regions are formed within exposure 94. overlay exposure region 112, 116, 118 and 122 are formed with four overlapping exposures; and overlapping regions 114 and 120 are formed with two overlapping double exposed regions. For example, overlay exposure region 112 is formed by the overlapping of exposures 124, 104, 92 and 94. Overlay region 114 is formed by the overlapping of exposure 104 and 94, both of which are double exposed in that region. The result of this overlapping of exposures is that overlay exposure regions 112, 114 and 116 are characterized as having substantially the same effective exposure time, i.e. $2(E_a+E_b)$, and an effective focus of −0.05, 0 and +0.05 micron, respectively. overlay exposure regions 118, 120 and 122 are characterized as having been formed with substantially the same exposure time, i.e. $2(E_b+E_c)$, and an effective focus of −0.05, 0 and +0.05 micron, respectively.

Relating these overlay exposure regions back to the focus exposure matrix 72 in FIG. 8, the process of creating the overlay exposure regions are stepped and repeated by incrementing the focus and exposure time to form a matrix of overlay exposure regions. The wafer having this overlay exposure matrix 72 is subsequently removed from the photostepper and undergoes an etching process. The remaining pattern disposed on the wafer after the etching process is completed defines the focus/exposure matrix 74. Each overlay exposure region corresponds to a pattern 66 of the focus/exposure matrix 72. As an example, overlay exposure regions 112, 114, 116, 118, 120 and 122 may have been the overlay exposures forming patterns (1,3), (1,4), (1,5), (2,3), (2,4) and (2,5), respectively. Residue patterns 67 surrounding the patterns 66 are not useable because they lack an adjacent pattern needed to form the overlay exposure regions.

FIG. 13 shows a flow diagram illustrating the steps in which the photostepper 61 undertakes to expose the resist 70 so that the focus/exposure matrix 72 may be formed. Although the diagram shows a preferred method of exposing the resist 70, it shall be appreciated that there are many ways to program the photostepper to expose the resist so that the same exposures form. A layer of resist 70 is thereafter disposed over the surface of the wafer 62.

The method of forming the focus/exposure matrix 72 on the wafer 62 is to first place the wafer 62, having the resist 70 disposed thereon, on the photostepper 61 such that the resist may be exposed to exposing radiation 76d. The photostepper 61 is first subject to an initializing step 132. At this step, the photostepper 61 is operated so that the frame 88 is positioned near an upper-left portion of the wafer 62. This position is designated the initial x-position $P_{ox}$ and the initial y-position $P_{oy}$, which at this step in the process is also the current x-position $P_{cx}$ and the current y-position $P_{cy}$. The photostepper's frame dimension SH is approximately 12 millimeters in the x-direction and 8 millimeters in the y-direction. The focus and exposure times settings of the photostepper 61 are initialized with an initial focus setting of $F_o$, which is also the current focus setting $F_c$, and an initial exposure time setting $E_o$, which is also the current exposure time setting $E_c$. In this step, an initial count is set to 0 (zero), denoting that the photostepper 61 will perform a first step and repeat exposure process with 12×8 millimeters squared sized exposures. After the first step and repeat exposure process is completed, the count is incremented to 1 to denote that a second step and repeat exposure process will be performed to double expose the middle portion of each 12×8 exposure. Also a direction indicator D will be set to 1 (one) at this step, denoting the direction in the x-direction in which the photostepper will expose a row of exposures. When D=1, the direction will be in the positive x-direction; when D=−1, the direction will be in the negative x-direction.

The photostepper 61 is then operated to expose the resist 70 to a row of exposures. This is accomplished by the loop defined by steps 134, 136 and 138. An exposure of the resist 70 is performed at step 134 at the initial position $P_{ox}$ and $P_{oy}$. In step 136, the position of the photostepper frame 88 is moved 8 millimeters in the positive x-direction. That is a movement of around two-thirds the size of the frame in the x-direction. At this step, the current focus $F_c$ is also incremented by $\Delta F$, the focus resolution of the photostepper 61. Step 138 checks whether the current frame x-position $P_{cx}$ has reached the end of the row, denoted as $P_{ex}$. Accordingly, prior to reaching the end of the row, the photostepper 61 will be repeating steps 134 and 136 so that a row of exposures are formed.

Once the frame position is at an end of a row, this occurs when $P_{cx}=P_{ex}$, in step 140 the frame position is then moved 4 (four) millimeters in the y-direction. This is a movement of around one-half the frame size in the y-direction. At this step, the current exposure time setting $E_c$ is also incremented by $\Delta E$, a preselected number such that the focus/exposure matrix have a sufficient exposure time range so that there is a good probability that the optimum exposure time setting falls within this range. Step 142 checks whether the current frame y-position $P_{cy}$ has reached the end of the columns of exposure $P_{ey}$. If it has not, the photostepper 61 proceeds to form another row of exposure. This is accomplished by changing the direction D to −1 in step 144 so that a row of exposures are formed in the negative x-direction. Changing D to −1 causes the position in step 136 to move in the negative x-direction, and also causes the focus to decrement. This is an efficient method of forming the exposures since the photostepper 61 zig-zags through the process. Step 136 multiplies the change in exposure time $\Delta E$ by N so that the exposure time increments in a non-linear fashion. That is, each successive row of exposures starting from the first will have an exposure time of $E_c$, $E_c+\Delta E$, $E_c+N\Delta E$, $E_c+N^2\Delta E$, $E_c+N^3\Delta E$ and so on, respectively. Because the power of the multiplication factor N is increased for successive rows, a non-linear incrementing of the exposure time results.

Once the photostepper has exposed the last row of exposures, this occurs when $P_{cy}=P_{cx}$, it is time to double expose each exposure's non-overlapping region, such as 100. Step 148 checks whether the count is equal to 1 (one); if it is not, then the photostepper 61 proceeds to double expose all regions 100. First, step 150 increments the count so that it equals 1 (one). This is done so that once all double exposures are completed, step 98 ends the photostepping process. In step 152, the photostepper 61 is initiated again. The current x and y frame positions, $P_{cx}$ and $P_{cy}$, are returned to the initial position, $P_{ox}$ and $P_{oy}$. The current focus $F_c$ and the current exposure time $E_c$ are also returned to its initial values, $F_o$ and $E_o$, respectively. The direction D is set to 1 (one) so that the photostepper exposes the first row moving in the positive x-direction. However, the second initializing step 152 changes the frame size to 4×8 millimeters squared so that only the middle overlapping region 100 of each exposure is double exposed. Steps 134 through 146 are repeated again in the same manner until all the overlapping regions 100 are double exposed. These steps are completed when step 148 determines that the count is equal to one. Once this occurs, the process of exposing the resist 70 is completed. The wafer 62 is then removed and the resist 70 is developed so as to leave a pattern disposed on the wafer 62 defining the focus/exposure matrix 72.

FIG. 14 shows a typical pattern 66 used in forming the focus/exposure matrix 72. It comprises a series of parallel lines 154 and parallel spacings 156, wherein each spacing separates each line. The width of the lines $L_w$ and spacings $S_w$ should coincide with the smallest line and space definitions of the production circuit patterns which are subsequently going to be formed using the photostepper. In other words, if the production circuit pattern have 0.6 micron as its smallest line and spacing definitions, then the pattern 66 preferably should have line width $L_w$ and space width SW approximately 0.6 micron wide. Similarly, if the circuit pattern have 0.4 micron as its smallest line and spacing definitions, then line width $L_w$ and space width $S_w$, preferably should be around 0.4 micron. This insures that when the focus/exposure matrix 72 is examined to determine the optimum focus and exposure time settings, the precision of the lines 154 and spacings 156 of the optimum pattern will correspond to the precision of the smallest lines and spacings of the production circuit pattern. This will also allow one to determine whether these dimensions are achievable.

It is to be understood that while the invention has been described above in conjunction with preferred specific embodiments, the description and examples are intended to illustrate and not limit the scope of the invention, which is defined by the scope of the appended claims.

It is claimed:

1. A method for verifying the accuracy of an average topography height function of a photostepper, the steps comprising:
   (a) placing a wafer on the photostepper for subjecting at least one layout disposed on said wafer to the average topography height function, wherein the layout has a known average topography height;
   (b) operating the average topography height function of the photostepper to determine a measured average topography height of the layout; and
   (c) comparing the known average topography height to the measured average topography height.

2. A method for verifying the accuracy of an average topography height function of a photostepper as defined in claim 1, wherein the wafer includes a plurality of layouts disposed thereon, each layout having a corresponding known average topography height, and further wherein the method further includes a step of repeating steps b and c for each layout.

3. A method for verifying the accuracy of an average topography height function of a photostepper as defined in claim 2, wherein the average topography height of each layout is substantially the same and each layout has a corresponding etch density.

4. A method for verifying the accuracy of an average topography height function of a photostepper as defined in claim 3, wherein the etch densities of the layouts range from 5 percent etch density to 95 percent etch density.

5. A method for verifying the accuracy of an average topography height function of a photostepper as defined in claim 4, wherein the method further includes a step of determining a trackable range for the average topography height function.

6. A method for compensating for an inaccuracy of an average topography height function of a photostepper, the steps comprising:
   (a) placing a wafer on the photostepper for subjecting at least one layout disposed on said wafer to the average topography height function, wherein the layout has a known average topography height;
   (b) operating the average topography height function of the photostepper to determine a measured average topography height of the layout;
   (c) comparing the known average topography height to the measured average topography height, wherein an error results defined as the difference between the known average topography height and the measured average topography height; and
   (d) compensating subsequent measurements of the average topography height function by an error correcting factor substantially equal to the magnitude of the error.

7. A method as defined in claim 6, wherein the wafer includes a plurality of layouts disposed thereon having each a corresponding known average topography height, and further the method includes a step of repeating steps b and c for each layout, wherein said correcting factor equals the average of the magnitude of the errors corresponding to each layout.

* * * * *